United States Patent [19]

Kremer

[11] Patent Number: 5,048,554
[45] Date of Patent: Sep. 17, 1991

[54] VALVE FOR A GAS CYLINDER

[75] Inventor: Paul Kremer, Walferdange, Luxembourg

[73] Assignee: Ceodeux S.A., Luxembourg, Luxembourg

[21] Appl. No.: 586,880

[22] Filed: Sep. 24, 1990

[30] Foreign Application Priority Data

Oct. 5, 1989 [LU] Luxembourg .................. 87601

[51] Int. Cl.5 ............................................ F16K 17/40
[52] U.S. Cl. ........................................ 137/69; 137/73
[58] Field of Search .................. 137/68.1, 69, 73, 74

[56] References Cited

U.S. PATENT DOCUMENTS 2,115,371  4/1938  Mossberg ...................... 137/69 X
4,352,365  10/1982  Boccardo et al. ................ 137/74 X
4,549,565  10/1985  Short, III ...................... 137/68.1 X Primary Examiner—John C. Fox
Attorney, Agent, or Firm—Leydig, Voit & Mayer

[57] ABSTRACT

The valve has an outlet safety channel (20) closed by a burstable diaphragm (26) wedged between the body (10) of the valve and a plug (24) fitted detachably in the body (10) of the valve, the said plug (24) comprising an axial passage (28) in communication with the outside and filled with a fusible material (32) up to where it comes into contact with the diaphragm (26). A rubber seal (30) resistant to temperatures above the melting point of the fusible material obstructs the axial passage (28) towards the outside.

3 Claims, 1 Drawing Sheet

VALVE FOR A GAS CYLINDER

The present invention relates to a valve for a gas cylinder, comprising an outlet safety channel closed by a burstable diaphragm wedged between the body of the valve and a plug fitted detachably in the body of the valve, the said plug comprising an axial passage in communication with the outside and filled with a fusible material up to where it comes into contact with the diaphragm.

This diaphragm withstands the normal filling pressures of the cylinder but is designed in order to burst above a given safety pressure. Such an abnormal elevated pressure in the cylinder may be produced, for example, following exposure of the cylinder to a heat source. In this case, the bursting of the diaphragm frees the gas contained in the cylinder and prevents the latter from exploding.

It has, however, been observed that the diaphragm may also burst when it should not burst, in other words without any elevated pressure or at a slight elevated pressure. This generally occurs when the diaphragms have been in service for a certain period of time and when they are worn or weakened by repeated stresses.

In order to prevent such a premature bursting of the diaphragm, it is known for a fusible plug to be arranged on the side opposite that which is exposed to the pressure of the gas inside the cylinder. The plug is made from a special alloy which melts at a temperature predetermined as a function of the composition of the alloy, for example between 60° and 90°. As long as the plug is solid, the diaphragm cannot burst, given that it bears against this plug. An additional advantage of this plug is that it reduces the mechanical stresses to which the diaphragm is exposed, given that the latter bears permanently against the plug as long as the plug is solid.

However, when the temperature exceeds the critical melting threshold of the plug, the latter melts and its material flows outwards. Consequently, with there no longer being any resistance opposing the diaphragm, the latter is free to burst if the pressure inside the cylinder exceeds the resistance threshold of the diaphragm. The simultaneous presence of two critical parameters are therefore required in order to cause the diaphragm to burst. The temperature must firstly exceed the melting threshold of the plug before a dangerous elevated pressure causes the diaphragm to burst.

However, such a fusible plug is disadvantageous for gas cylinders used in the manufacture of optical fibres or in semi-conductor technology, in particular for doping semi-conductors. These gases must be almost absolutely pure as the slightest impurity, solid, liquid or gas, no matter how microscopic, can disturb the procedure for doping and manufacturing these materials. This is why these cylinders must be absolutely clean and they are to this end heated, before each filling, to a temperature exceeding 100° in order to eliminate any trace of humidity. Now given that this temperature exceeds the melting temperature of the fusible plug, the latter must be removed for the cleaning and cannot be treated in the same way as the cylinder with the result that there is a risk of it not having the same degree of cleanness.

The object of the present invention is to overcome this problem by way of a fusible plug which does not have to be removed for cleaning operations of the cylinder.

In order to achieve this object, the invention proposes a valve of the type described in the introduction which is essentially characterized by elastic means obstructing, towards the outside, the axial passage and resistant to temperatures above the melting point of the fusible material.

In a preferred embodiment, the said axial passage communicates with the outside through radial holes opening into an outer peripheral groove, while the said elastic means consist of an O-ring seal housed in the said groove and preventing the fusible material from flowing out when liquid. The O-ring seal is preferably made from rubber.

This O-ring seal consequently enables the fusible plug to undergo the heat treatment of the cylinders as it enables the plug to melt whilst at the same time preventing its liquid material from flowing away after melting. On the other hand, it does not disturb the normal functioning of the plug as the seal is sufficiently elastic in order to yield at an elevated pressure of the plug after the latter has melted and under the influence of the pressure exerted by the diaphragm or under the action of the elevated pressure after the diaphragm has burst.

Other features and characteristics will emerge from the detailed description of an advantageous embodiment given hereinbelow by way of illustration and with reference to the attached drawings, in which:

FIG. 1 shows a valve whose body 10 has a thread 12 enabling it to be screwed onto a gas cylinder, not shown, containing a compressed gas at a pressure of the order of $2.10^7$ Pa.

Figure 1:
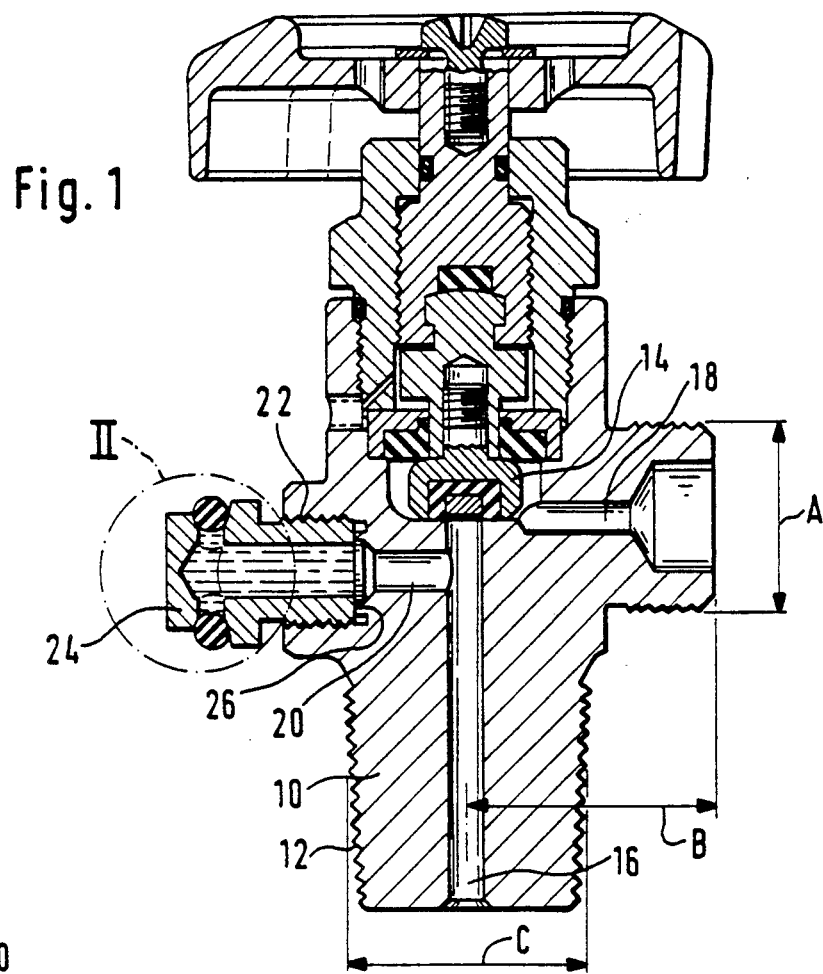
FIG. 1 shows diagrammatically a valve according to the present invention in axial cross-section.

A movable sealing element 14, fitted in a manner known per se inside the body 10 and actuated by an operating wheel, enables the communication between the inside of the cylinder and a use system through an axial channel 16 and a radial channel 18 in the body 10 of the valve to be established or interrupted.

The inside of the cylinder is in addition in communication through the axial channel 16 with a radial channel 20 which opens into a housing 22 provided in the body 10 of the valve and into which a plug 24 is screwed or fastened in another detachable manner from the outside. A burstable diaphragm 26 preferably metal, is wedged at the bottom of the housing 22 between the plug 24 and a radial shoulder surrounding the channel 20. This diaphragm 26 is calibrated in order to withstand the normal pressures prevailing in the cylinder, but in order to burst at a given pressure corresponding to a dangerous elevated pressure in the cylinder.

Figure 2:
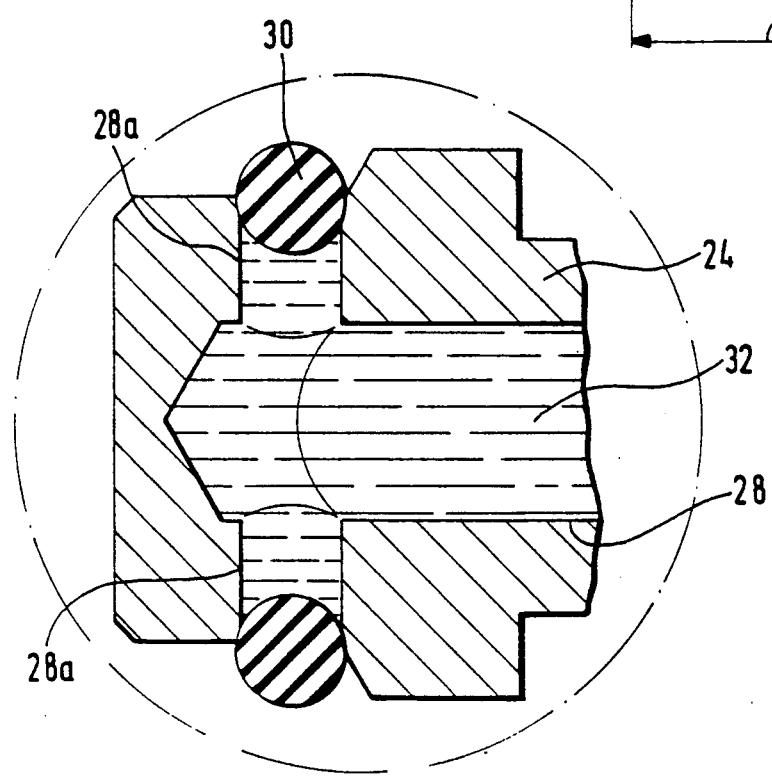
FIG. 2 shows an enlarged view of the circled part II of FIG. 1.

As shown in FIG. 1 and, in more detail, in FIG. 2, the plug 24 has an axial passage 28 which communicates with the outside through 2 or 4 radial holes 28a. This axial passage 28 and the radial holes 28a are filled with an alloy 32 which melts at a given temperature, for example between 60° and 90° depending on the composition of the alloy. As long as this fusible material 32 is solid, it prevents the diaphragm 26 from bursting and reduces the mechanical stresses on it. However, in order to prevent having to remove the plug 24 during the treatment of an empty cylinder by heating to a point above the melting temperature of the fusible material 32, the present invention proposes providing means which permit the fusible material 32 to melt and prevent it from flowing out of the plug 24 after it has melted. In the most simple embodiment, these means consist of an O-ring seal 30, for example made from rubber, which is housed in an outer peripheral groove of the plug 24 and into which open the radial holes 28a. This O-ring seal 30 has a twin function. Firstly, by virtue of its elasticity, it enables the holes 28a to be closed tightly when the material inside the plug is a liquid and when it is not subjected to pressure. On the other hand, when the melted material inside the plug 24 is subjected to pressure, either under the action of the diaphragm 26 or under the action of the elevated pressure inside the cylinder after the diaphragm 26 has burst, the O-ring seal 30, by virtue of its elasticity, yields under the action of this pressure and enables the liquid material 32 to flow out and the gases to escape through the emptied plug 24 in order to prevent the cylinder from exploding as a result of an elevated pressure. The O-ring seal 30 is, of course, designed in order to withstand the temperatures employed for treating empty cylinders.

I claim:

1. Valve for a gas cylinder, comprising an outlet safety channel (20) closed by a burstable diaphragm (26) wedged between the body (10) of the valve and a plug (24) mounted detachably in the body (10) of the valve, the said plug (24) comprising an axial passage (28) in communication with the outside and filled with a fusible material (32) up to where it comes into contact with the diaphragm (26), characterized by elastic means obstructing, towards the outside, the axial passage (28) and resistant to temperatures above the melting point of the fusible material.

2. Valve according to claim 1, characterized in that the said axial passage (28) communicates with the outside through radial holes (28a) opening into an outer peripheral groove of the plug (24) and in that the said elastic means consist of an O-ring seal (30) housed in the said groove and preventing the fusible material from flowing out when liquid.

3. Valve according to claim 2, characterized in that the seal (30) is made from rubber.

* * * * *